United States Patent [19]
Luppi

[11] 3,962,095
[45] June 8, 1976

[54] DIALYSER CARTRIDGE

[75] Inventor: Liberto Luppi, Mirandola, Italy

[73] Assignee: Sandoz Ltd., Basel, Switzerland

[22] Filed: Nov. 4, 1974

[21] Appl. No.: 520,553

Related U.S. Application Data

[63] Continuation-in-part of Ser. No. 417,342, Nov. 19, 1973, abandoned.

[30] Foreign Application Priority Data

June 22, 1973  Italy.................. 25766/73

[52] U.S. Cl. ......................... 210/321 A; 210/494 M
[51] Int. Cl.² ......................................... B01D 31/00
[58] Field of Search ............................. 210/321, 494

[56] References Cited
UNITED STATES PATENTS

| | | | |
|---|---|---|---|
| 3,397,790 | 8/1968 | Hewby et al..................... | 210/494 X |
| 3,510,004 | 5/1970 | Hoeltzehbein.................. | 210/494 X |
| 3,687,293 | 8/1972 | Carter............................... | 210/321 |
| 3,712,475 | 1/1973 | Martinez......................... | 210/494 X |
| 3,852,198 | 12/1974 | Murakami....................... | 210/494 X |

*Primary Examiner*—Frank A. Spear, Jr.
*Attorney, Agent, or Firm*—Gerald D. Sharkin; Robert S. Honor; Walter F. Jewell

[57] ABSTRACT

The invention concerns a novel dialyser cartridge comprising a flat membrane tube through which blood to be dialysed may be passed, membrane support material over the outer surfaces of the membrane tube, a split core between which a central portion of the membrane tube and membrane support material is located and about which core said membrane tube and membrane support material are outwardly spirally wound so that the free ends of the membrane tube and membrane support material are situated at the outer periphery of the winding, a hollow cylindrically walled casing encasing the split core and spirally wound membrane tube and membrane support material, blood inlet means for connection to an arterial line and blood outlet means for connection to a blood venous line leading through the circumferential wall of the casing into the ends of the membrane tube, and a pair of end covers fixed to the ends of the hollow cylindrical casing, one end cover having a dialysate inlet for connection to a dialysate supply line and the other end cover having a dialysate outlet for connection to a dialysate take-off line.

7 Claims, 5 Drawing Figures

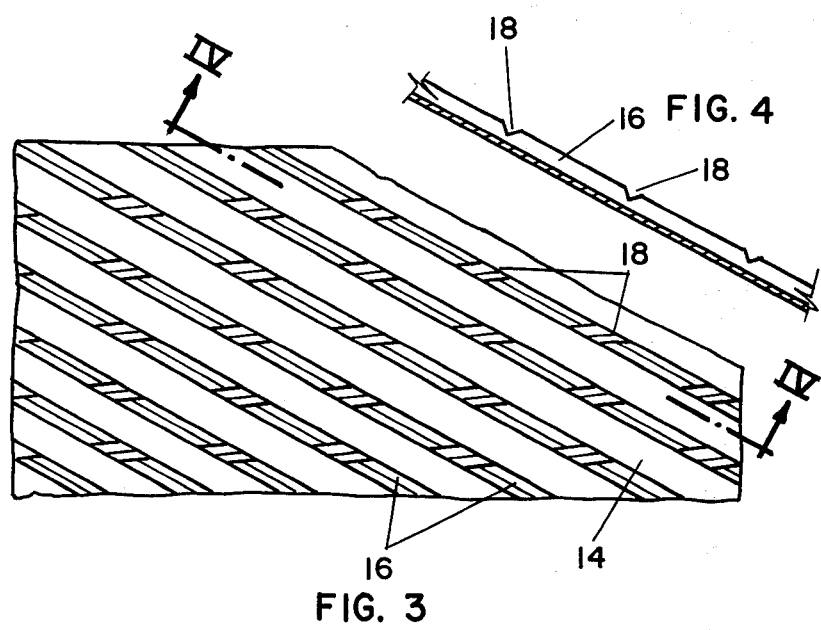
FIG. 3
FIG. 4
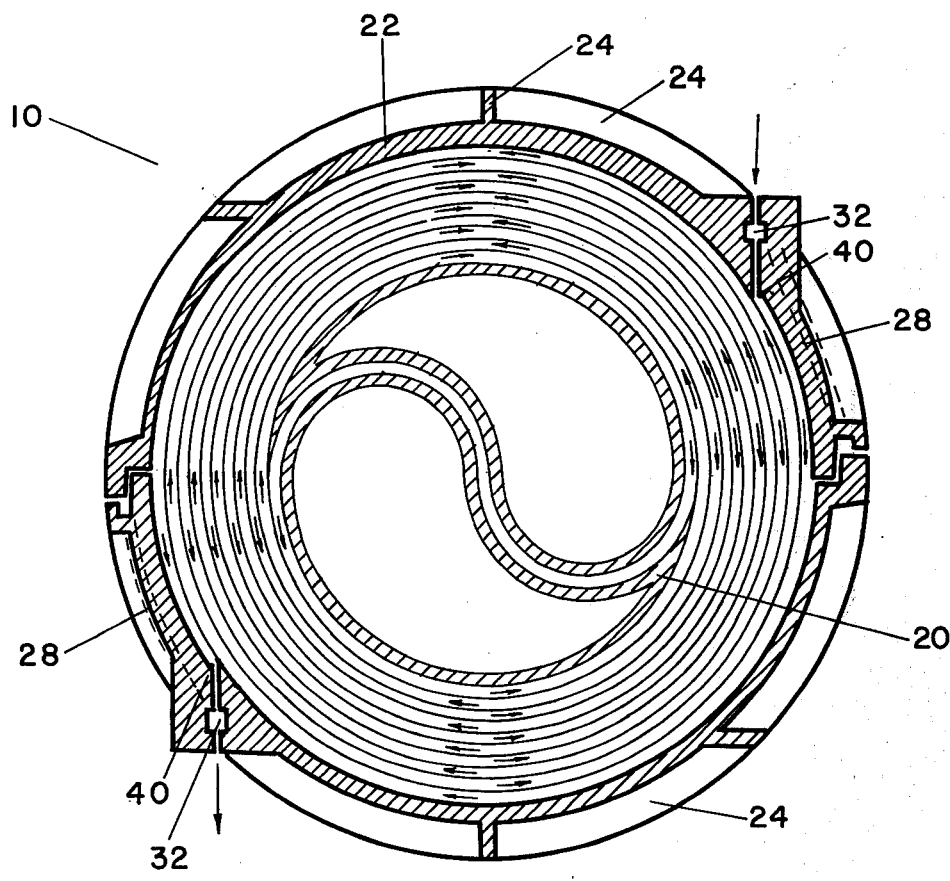
FIG. 5

DIALYSER CARTRIDGE

This is a continuation-in-part of copending application Serial No. 417,342, filed Nov. 19, 1973, now abandoned. The invention concerns a dialyser cartridge particularly suitable for extracorporeal dialysis of blood.

Dialyser cartridges of the coil type which comprise a central hollow core about which a membrane tube and membrane support material is wound in a single spiral are in use. In such devices, the blood inlet (our outlet) leads into the membrane tube through the central hollow core and the blood outlet (or inlet) leads out of the membrane tube at or towards the outer periphery of the spiralled membrane tube and membrane support material. Connection of the blood inlet and outlet lines to the membrane tube has, in known devices, involved practical difficulties in that, for example, a confined space needs to be worked in when connecting up blood lines to the membrane tube through the central hollow core.

An object of the present invention is to provide a coil-type dialyser of a construction enabling both blood inlet and outlet connection at the outer periphery of the spiral and furthermore to provide a dialyser of the coil type in which there are no free spaces through which preferential flow of dialysate, necessitating recirculation of dialysate, can take place.

In accordance with the invention, there is provided a dialyser cartridge comprising a flat membrane tube through which blood to be dialysed may be passed, membrane support material over the outer surfaces of the membrane tube, a split core between which a central portion of the membrane tube and membrane support material is located and about which core said membrane tube and membrane support material are outwardly spirally wound so that the free ends of the membrane tube and membrane support material are situated at the outer periphery of the winding, a hollow cylindrically walled casing encasing the split core and spirally wound membrane tube and membrane support material, blood inlet means for connection to an arterial line and blood outlet means for connection to a blood venous line leading through the circumferential wall of the casing into the ends of the membrane tube, and a pair of end covers fixed to the ends of the hollow cylindrical casing, one end cover having a dialysate inlet for connection to a dialysate supply line and the other end cover having a dialysate outlet for connection to a dialysate take-off line.

The membrane support material may comprise a series of spaced apart parallel elements lying against the outer surfaces of the membrane tube, the parallel members against one side of the membrane tube being at an angle relative to the series of parallel members against the other side of the membrane tube. The membrane support material may comprise bands of sheet material having on one side a series of spaced apart parallel ribs which then constitute the parallel members, the membrane tube being sandwiched between a pair of such bands with their ribs facing inwardly towards one another. The parallel members against one side of the membrane tube may be at an acute angle relative to the axis of the cylindrical casing, and the parallel members against the other side of the membrane tube may be at the same but opposite acute angle relative to said axis. The parallel members may have a series of spaced grooves, the grooves in adjacent parallel members being substantially parallel to the length of the membrane tube.

The split defined by the split core may be of substantially S-section, and the split core as a whole may be of substantially circular section. In this manner, presuming that the split core sections are closed-ended, little or no free space, through which preferential flow of dialysis liquid would take place, is defined.

The hollow cylindrically walled casing may have at its inner surface a pair of radially directed abutment face of a breadth corresponding to the thickness of the membrane support material to abut against the free ends of the membrane support material at the outer periphery of the spiral. The purpose of these abutment faces, it will be appreciated is as with the S-sectioned split core, to eliminate any free space through which preferential flow of dialysis liquid would take place.

The blood inlet and blood outlet means may comprise connector elements having means for connection to an arterial line and venous line respectively and may have flat convex-sectioned hollow mouth sections sealingly located in the ends of the flat membrane tube between its adjacent sheets.

The ends of the membrane tube and the blood inlet and blood outlet means may be located between seals provided in the circumferential walls of the casing.

The invention will now be described with reference to the accompanying drawings showing, by way of example, an embodiment of the invention.

In the drawings:

FIG. 3 shows an enlarged detail of the membrane support material;

FIG. 4 shows an edge-on view of the membrane support material viewing as indicated by IV—IV in FIG. 3; and FIG. 5 shows a plan cross-section of the coil dialyser in assembled condition, the form of the casing being slightly modified from that shown in FIG. 1.

Figure 1:
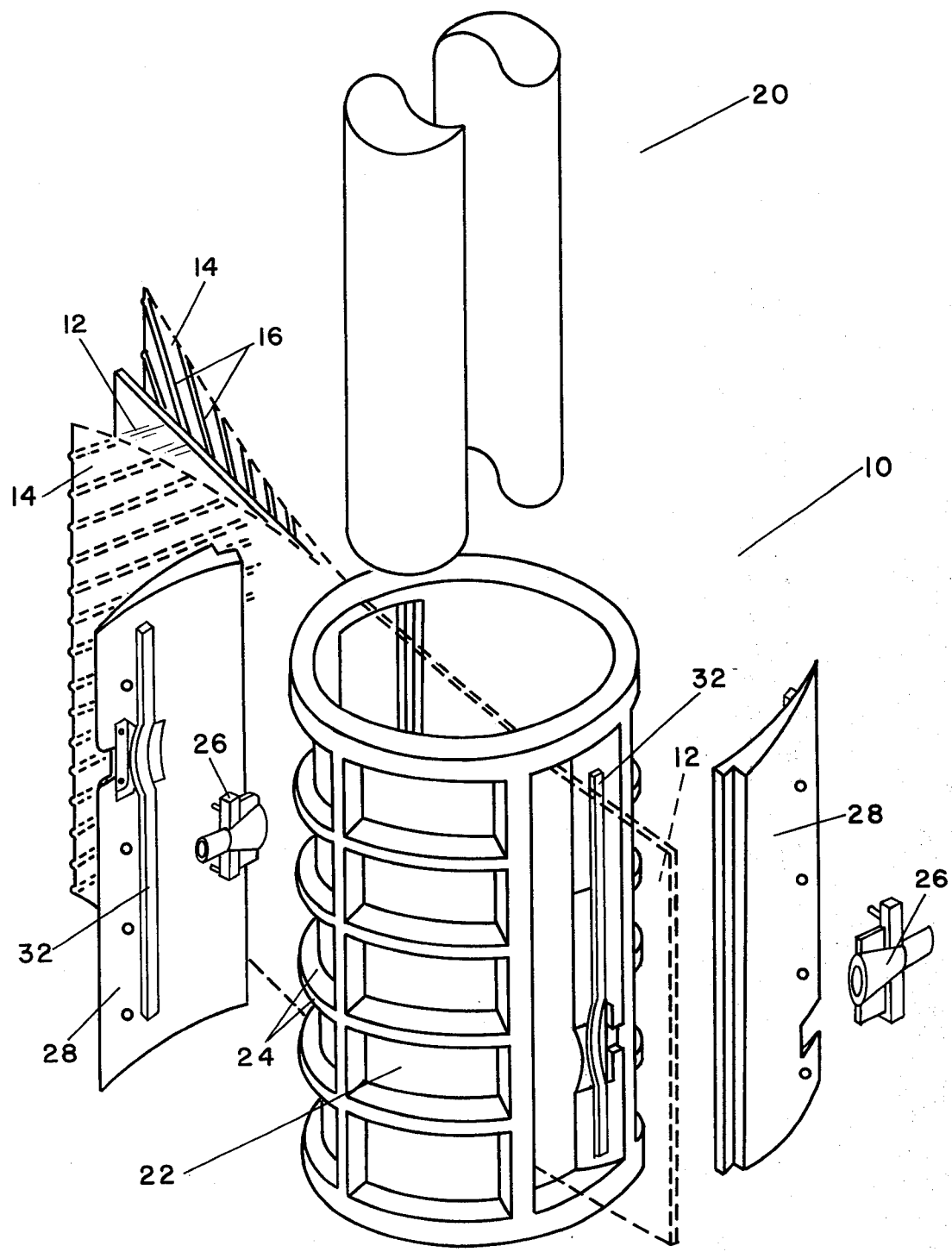
FIG. 1 shows a perspective exploded view of a coil dialyser, wherein the membrane tube and membrane support material have not yet been wound about the split core.

Referring to the drawings, reference numeral 10 refers generally to a dialyser cartridge, which comprises a flat membrane tube 12 through which blood to be dialysed may be passed, and membrane support material 14 over the outer surfaces of the membrane tube 12. The membrane support material comprises bands of sheet material having on one side a series of spaced apart parallel ribs 16. The ribs 16 against one side of the membrane tube 12 are at an angle relative to the series of ribs against the other side of the membrane tube. In the embodiment shown, the ribs are at an acute angle relative to the axis of the cylindrical casing, the one set of ribs against the one side of the membrane tube 12 being at the same but opposite acute angle relative to said axis as the other set of ribs against the other side of the membrane tube.

Referring to FIGS. 3 and 4 of the drawings, the ribs 16 have a series of spaced grooves 18, the grooves being substantially parallel to the length of the membrane tube 12. These grooves 18 allow small quantities of blood to flow parallel to the length of the membrane tube 12 instead of only in the well-known criss-cross turbulent flow which arises in dialyser arrangements having membrane supports comprising ribs or strands at an angle relative to one another on either side of the membrane tube 12.

A split core referred to generally by reference numeral 20 is provided at the centre of the dialyser cartridge 10, between which a central portion of the membrane tube 12 and membrane support material 14 is located. The membrane support material 14 is outwardly spirally wound about the split core 20 (refer FIG. 5) so that the free ends of the membrane tube 12 and membrane support material 14 are situated at the outer periphery of the winding. The split defined by the split core is of substantially S-section, and the split core as a whole is of substantially circular section. As can be seen from FIG. 5, no free spaces, through which preferential flow of dialysate can take place, are formed.

A hollow cylindrically walled casing 22 encases the split core 20 and spirally wound membrane tube 12 and membrane support material 14. Reinforcing elements 24 are provided to strengthen the cylindrical casing and to prevent such from bulging or collapsing under positive or negative pressure.

Figure 2:
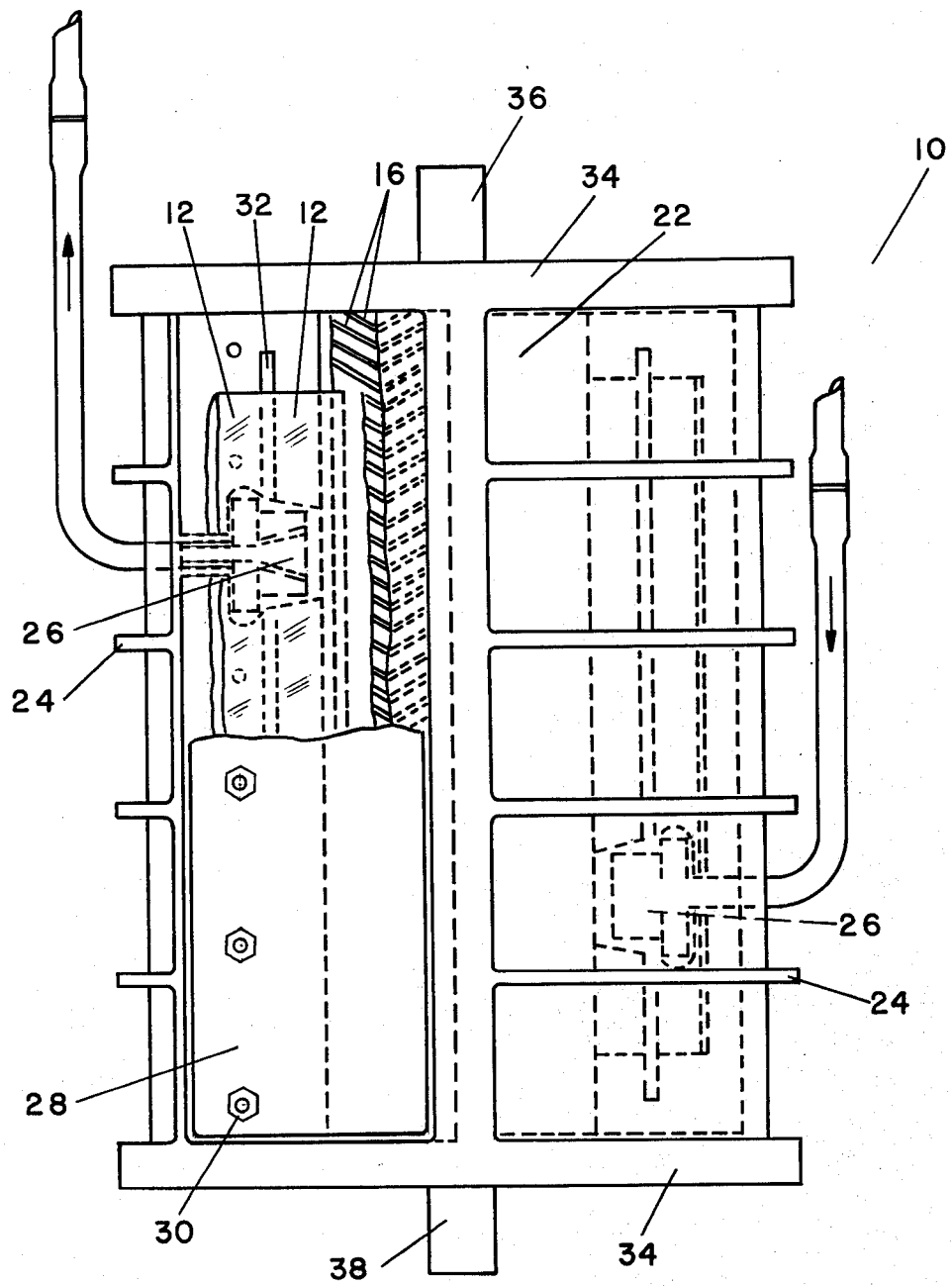
FIG. 2 shows a partly broken away side elevation of the dialyser cartridge of FIG. 1, in assembled condition.

Blood inlet means 26 and blood outlet means, also numbered 26 since blood inlet and blood outlet are interchangeable, are provided for connection to an arterial line and venous line respectively. The blood inlet and blood outlet means lead through the circumferential wall of cylindrical casing 22 into the ends of the membrane tube 12. The cylindrical casing 22 comprises a pair of wedge-sectioned cover plates 28 which mate with and are secured to the wall of the cylindrical casing by means of screws 30. The wall of the cylindrical casing and cover plates 28 in combination form a seat for seating the blood inlet and blood outlet 26, and furthermore each carry a seal 32 to seal the free ends of the membrane tube 12 with the blood inlet and blood outlet means 26 at the ends of the membrane tube between its adjacent sheets. A pair of end covers 34 (see FIG. 2) are fixed to the ends of the hollow cylindrical casing 22, one end cover having a dialysate inlet 36 (normally at the top) for connection to the dialysate supply line (not shown) and the other end cover 34 having a dialysate outlet 38 for connection to a dialysate take-off line (not shown).

The hollow cylindrically walled casing has at its inner surface, in the embodiment shown on the cover plates 28, a pair of radially directed abutment faces 40 corresponding to the thickness of the membrane support material 14 to abut against the free ends of the support material at the outer periphery of the spiral. As can be seen from FIG. 5, no free spaces through which preferential flow of dialysate can take place, are formed.

The dialyser cartridge of the invention can be employed in conventional manner. Thus, blood is pumped through the membrane tube 12, whilst dialysate flows over the outer surfaces thereof through the passages defined by the surface of the membrane tube itself and the surface of the membrane support material 14, between adjacent ribs 16. Blood flows through the membrane tube 12 spirally inwardly to the centre of the split core 20 and then spirally outwardly to the blood outlet at the outer periphery of the winding.

I claim:

1. A dialyser cartridge comprising a flat membrane tube through which blood to be dialysed may be passed, membrane support material over the outer surfaces of the membrane tube, a split core between which a central portion of the membrane tube and membrane support material is located and about which core said membrane tube and membrane support material are outwardly spirally wound so that the free ends of the membrane tube and membrane support material are situated at the outer periphery of the winding, the membrane support material comprising bands of sheet material having on one side a series of spaced apart parallel ribs lying against the outer surface of the membrane tube, the membrane tube being sandwiched between a pair of such bands with their ribs facing inwardly towards one another, the series of parallel ribs against one side of the membrane tube being at an angle relative to the series of parallel ribs against the other side of the membrane tube, a hollow cylindrically walled casing encasing the split core and spirally wound membrane tube and membrane support material, blood inlet means for connection to an arterial line and blood outlet means for connection to a blood venous line leading through the circumferential wall of the casing into the ends of the membrane tube, and a pair of end covers fixed to the ends of the hollow cylindrical casing, one end cover having a dialysate inlet for connection to a dialysate supply line and the other end cover having a dialysate outlet for connection to a dialysate take-off line.

2. A dialyser cartridge according to claim 1, wherein the parallel members against one side of the membrane tube are at an acute angle relative to the axis of the cylindrical casing, and wherein the parallel members against the other side of the membrane tube are at the same but opposite acute angle relative to said axis.

3. A dialyser cartridge according to claim 2, wherein the parallel members having a series of spaced grooves in adjacent parallel members, said grooves being substantially parallel to the length of the membrane tube.

4. A dialyser cartridge according to claim 1, wherein the split defined by the split core is of substantially S-section, and wherein the split core as a whole is of substantially circular section.

5. A dialyser cartridge according to claim 1, wherein the hollow cylindrically walled casing has at its inner surface a pair of radially directed abutment faces of a breadth corresponding to the thickness of the membrane support material to abut against the free ends of the membrane support material at the outer periphery of the spiral.

6. A dialyser cartridge according to claim 1, wherein the blood inlet and blood outlet means comprise connector elements having means for connection to an arterial line and venous line respectively and having flat convex-sectioned hollow mouth sections sealingly located in the ends of the flat membrane tube between its adjacent sheets.

7. A dialyser cartridge according to claim 1, wherein the ends of the membrane tube and the blood inlet and blood outlet means are located between seals provided in the circumferential walls of the casing.

* * * * *